Figure 1:
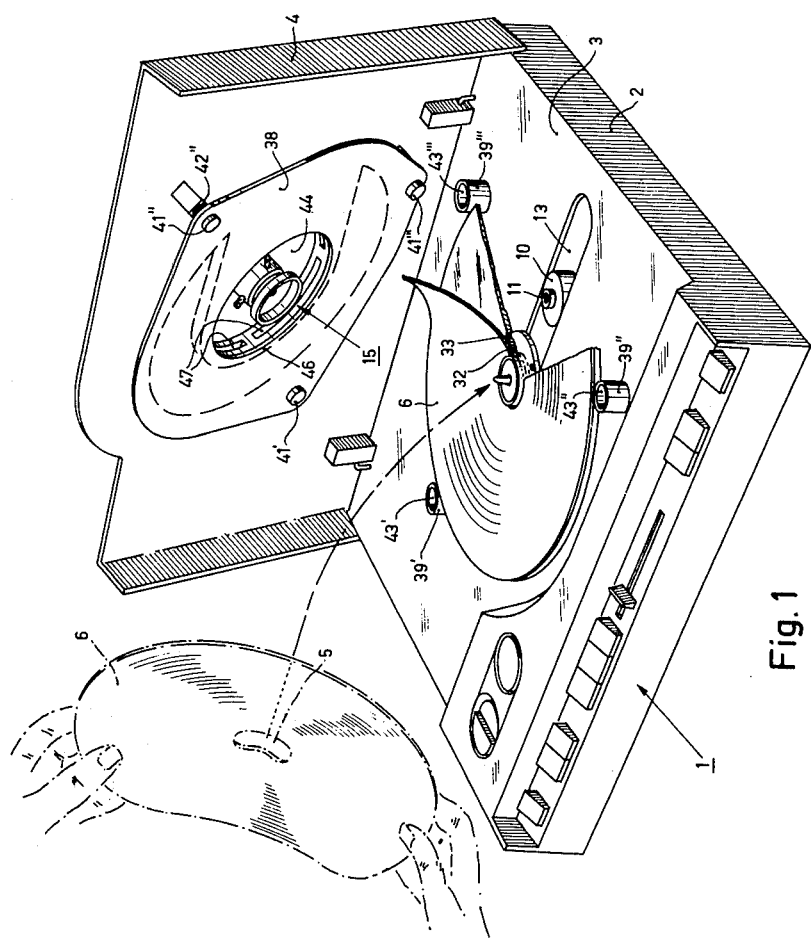

United States Patent [19]
Iemenschot

[11] 4,002,826
[45] Jan. 11, 1977

[54] PLAYBACK APPARATUS, IN PARTICULAR, VIDEO PLAYER, FOR PLAYING ROUND RECORDS PROVIDED WITH INFORMATION TRACKS

[75] Inventor: Johannes Andreas Iemenschot, Eindhoven, Netherlands

[73] Assignee: U.S. Phillips Corporation, New York, N.Y.

[22] Filed: June 5, 1975

[21] Appl. No.: 583,989

[30] Foreign Application Priority Data
Mar. 12, 1975 Netherlands ............. 7502914

[52] U.S. Cl. .................. 358/128; 274/39 R; 346/137; 360/86; 360/99
[51] Int. Cl.² ............ G11B 3/60; G11B 5/016; H04N 7/00
[58] Field of Search ............. 274/9 R, 9 B, 39 R, 274/39 A, 41.6 R, 41.6 A, 42 R; 360/86, 97, 99; 178/6.6 R, 6.6 DD, 6.7 A, 1.3 B; 346/137

[56] References Cited
UNITED STATES PATENTS
2,943,861  7/1960  Redfield ............. 274/9 R
3,863,266  1/1975  Hoshino ............. 360/86

Primary Examiner—Steven L. Stephan
Attorney, Agent, or Firm—Frank R. Trifari; Simon L. Cohen

[57] ABSTRACT

A playing apparatus, in particular a video player, for playing round records provided with information tracks and comprising a housing with a substantially flat covering plate, a drive spindle, a cover which is hinged to the housing and a stabilizing plate which is resiliently connected to the cover. On the cover a number of supports are provided which when the cover is closed support the stabilizing plate at a height which is accurately defined relative to the covering plate.

6 Claims, 4 Drawing Figures

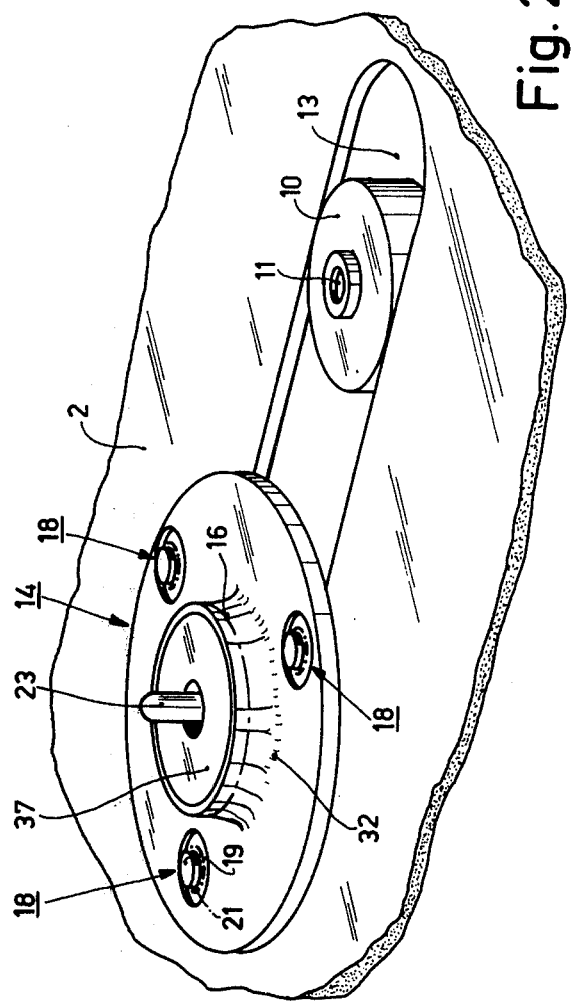
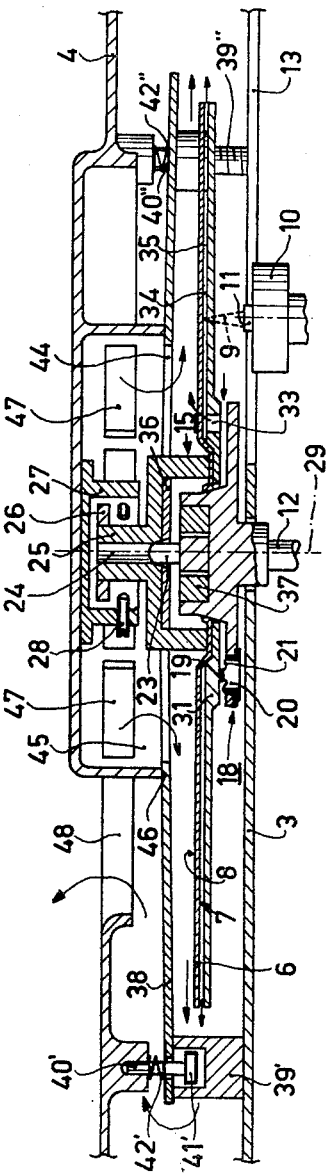

PLAYBACK APPARATUS, IN PARTICULAR, VIDEO PLAYER, FOR PLAYING ROUND RECORDS PROVIDED WITH INFORMATION TRACKS

The invention relates to a playback apparatus, in particular a video player, for playing round records which are provided with information tracks, which apparatus comprises a housing with a substantially flat covering plate, a motor driven drive spindle which extends outside the housing for rotating the record parallel to the covering plate, a cover which is hinged to the housing and which in the closed condition covers the cover plate with drive spindle, and a stabilizing plate which is resiliently connected to the cover and which when the cover is closed extends substantially perpendicularly to the axis of the drive spindle, for stabilizing a record in its plane of rotation during playing while the cover is closed.

From German Offenlegungsschrift No. 2,343,350 a playing apparatus of the present type is known. This concerns a video player where the information is contained in annular or spiral information tracks on a magnetic disc which consists of a flexible material and which is provided with a magnetizable surface layer. The magnetic disc is arranged on the drive spindle and rotated by said spindle. During rotation the magnetic disc is situated at a small distance from the covering plate. Between the covering plate and the magnetic disc an air cushion is formed, while an air cushion is also formed between the magnetic disc and the stabilizing plate. A problem which occurs with such an apparatus is a certain instability of the magnetic disc near its periphery. In order to solve this problem the stabilizing plate in the known apparatus takes the form of a cone frustum which is disposed so relative to the magnetic disc that the periphery of the magnetic disc is nearer to the stabilizing plate than the more central parts. In the center of the stabilizing plate an air admission aperture is provided, while moreover a multitude of small air admission apertures are distributed over the stabilizing plate.

The position of the stabilizing plate which it assumes during rotation relative to the magnetic disc and thus relative to the covering plate, is essential for obtaining a satisfactory stabilization of the flexible record. In the known device said position depends completely on the accurary with which the cover is mounted relative to the other parts of the housing and also with which the covering plate is mounted.

It is an object of the invention to provide a playing apparatus of the type mentioned in the preamble which mitigates these problem and which moreover has other advantages, and the invention is characterized in that covering plate comprises a number of supports which when the cover is closed co-operate with the stabilizing plate and determine its position relative to the covering plate. In this respect it is of advantage if the number of supports is three and the supports press against the covering plate when the cover is closed.

In the playing apparatus according to the invention the position of the stabilizing plate relative to the covering plate and thus relative to the video record, if present, is completely determined by the co-operation of the supports with the side of the stabilizing plate which faces them. In said embodiment, in which said supports directly bear against the stabilizing plate when the cover is closed, the position of the stabilizing plate is exclusively determined by the dimensions of the supports. The use of three supports ensures a uniquely defined position.

An embodiment of the invention is characterized in that the resilient attachment of the stabilizing plate to the cover comprises a number of guide pins which are rigidly connected to the cover, the stabilizing plate is provided with openings which surround the guide pins with play, the guide pins comprise stops for the guide plate near their free ends which are remote from the cover, and between the cover and the stabilizing plate pressure springs are disposed around the guide pins. The supports on the covering plate may be provided with recesses for receiving the free ends of the guide pins when the cover is closed.

For a very accurate and adjustable position of the stabilizing plate an embodiment is of significance which is characterized in that the supports are adjustable in height relative to the covering plate. Such an adjustment possibility can for example be achieved by providing the supports with screwthreads which co-operate with the corresponding openings in the covering plate. In the case of a playing apparatus in which the stabilizing plate comprises a central air outlet through which while a record is being played air between the stabilizing plate and the rotating record is discharged, an embodiment is of significance which is characterized in that the cover has a hole which corresponds to the air outlet of the stabilizing plate, the edge of the air admission aperture is rigidly connected to the cover, the resilient connection of the stabilizing plate to the cover is situated near its circumference, and the stabilizing plate is made of a resiliently deformable material. In this respect it is of advantage if, when the cover is closed, the distance between a rotating record and the edge of the air admission aperture is greater by an amount of the order of 1 mm than the distance between the circumference of the record and the stabilizing plate.

Figure 3:
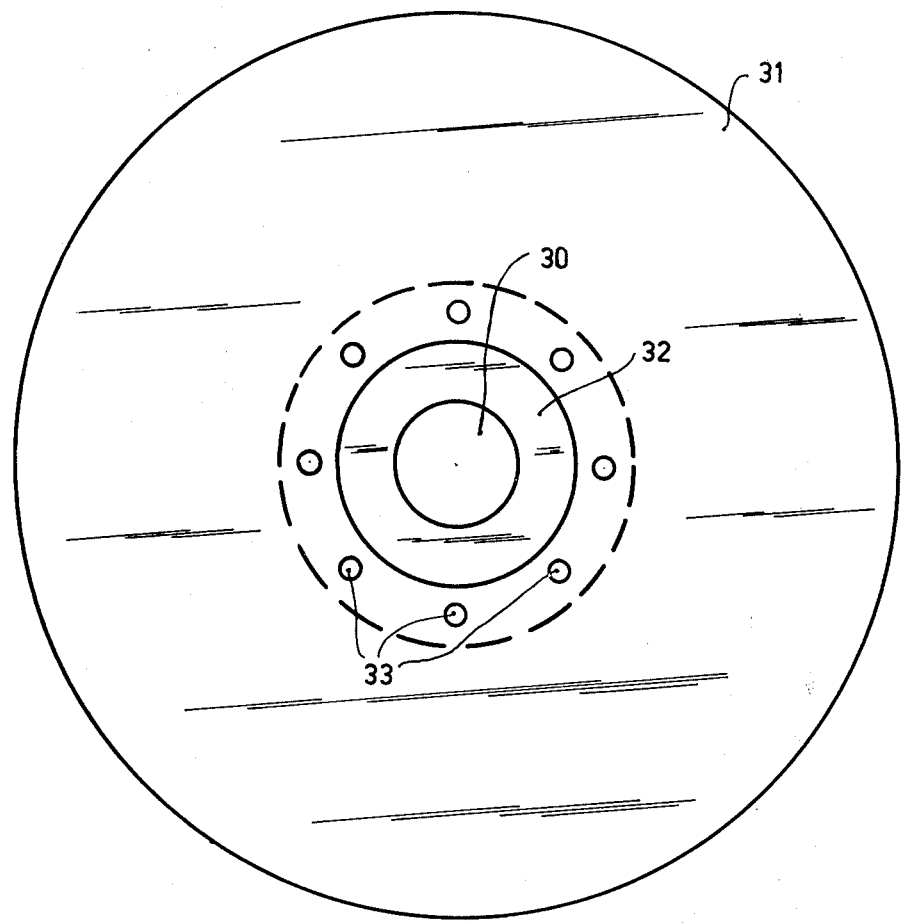

The invention will now be described in more detail with reference to the drawing, in which:

FIG. 1 is a perspective view of a video player with open cover, in which in the drive spindle a transparent adapter disc as well as a flexible foil is arranged, which are both partly shown in section, FIG. 2 is a scaled-up perspective view of the record support of the video player of FIG. 1, FIG. 3 is a top view of the adapter disc which is used, and FIG. 4 is a cross-section through the drive spindle with closed cover.

The clamping device shown in the drawing and the adapter disc which is shown form the subject of the Applicant's previous patent application Ser. No. 583,988, filed June 5, 1975 and application Ser. No. 583,987, filed June 5, 1975.

The playing apparatus 1 of FIG. 1 comprises a housing 2 with a substantially flat covering plate 3 and a cover 4 which is hinged to the housing. The player serves for playing round video records 6 with a central hole 5 which are made of a transparent material. These records have a transparent surface 7 at one side which when the record is disposed on the video player faces the covering plate 3. At its other side the record has a surface 8 on which the information is contained in the form of local recesses and/or elevations, as well as a light-reflecting layer. Said layer is too thin to be shown in the drawing. With the aid of a light source, not shown, a read beam 9 can be projected on the surface 8 through the transparent surface 7 via a focussing device 10 with an objective 11 and the reflected beam can be returned to information detection means which are located in the housing.

A motor driven drive spindle 12 extends from the housing 2 for rotating the video record 6 parallel to the covering plate. The optical focussing device 10 is radially movable in the housing relative to the drive spindle in a slot 13. Said focussing device is adapted to co-operate with a rigid video record having a thickness of approx. 1.1 mm.

A record clamping device disposed on the drive spindle comprises a record support 14 which co-operates with the rigid record outside the range of the information tracks near a central hole of the record. Said clamping device, in addition to the record support 14 also comprises a spring-loaded record loading device 15 which co-operates with the record near the central hole and which forms the subject of the Applicant's aforementioned patent application Ser. No. 583,988. On the flange-shaped record support 14 a conical centering member 16 is provided whose centering surface 17 has a diameter which varies from smaller than the diameter of the central hole of a video record to a diameter greater than that of the central hole. When a rigid record is in position it can make a slightly tilting movement relative to the record support 14. Further towards the outside three record drive members 18 are disposed in the flange 14 which each comprise a friction block 19 which is integral with the plastic ring 20 and which is connected thereto by means of a resilient and flexible portion 21. The record loading device 15 consists of a pressure ring 22 which when the cover is closed, see FIG. 4, is magnetically loaded in the direction of the record support 14. For this purpose an annular permanent magnet 37 is disposed in the center of the record support and a soft-iron plate 37 in the record loading device. The record loading device 15 is positioned relative to the spindle 12 by means of a locating pin 23 on the drive spindle and a corresponding hole 24 in the record loading device. Said hole is located in a cylindrical portion 25 which at its upper side comprises a flange 26. Said flange is disposed inside a bushing 27 which is connected to the cover 4 in a suitable manner. Three screws 28 retain the record loading device 15 when the cover is opened, but both said screws and the bushing 27 itself leave the record loading device 15 completely free when the cover is closed. With the aid of the clamping device described a video player is obtained on which rigid video records can be fitted in a manner which is easy for the user and fully in accordance with the manner in which a gramophone record is put onto the turntable of a gramophone. An oblique position of the record on the centering member 16 presents no problem. Once the record gathers speed it will be aligned purely perpendicularly to the axis 29 of the drive spindle 12 under the influence of the centrifugal forces acting on it. The magnetic force with which the ring 22 of the record loading device bears on the record has been selected so that the friction which occurs between the edge of the central hole of a rigid video record and the centering surface 17 does not impair alignment of the record. The driving which is required for transmitting the drive torque is provided by the friction blocks 19.

For playing video records 6 which are made of a thin flexible foil the record support 14 also includes a transparent plane-parallel adapter disc 31 which is provided with a central hole 30 and which is detachable from the centering member 16. Said adapter disc has a thickness which substantially equals the difference between the thickness of a rigid record for playing which the playing apparatus 1 is mainly equipped, and the thickness of the flexible record 6, and a diameter which is at least substantially equal to that of the record. Near the central hole 30 a recessed portion 32 is disposed concentric therewith. Around said portion a number of air admission apertures are provided which during operation serve for admitting air between the flexible record to be played and the plane-parallel surface of the adapter disc which faces said record.

A stabilizing plate 38 is resiliently connected to the cover 4. When the cover is closed the stabilizing plate is substantially perpendicular to the axis 29 of the drive spindle. On the covering plate 3 three supports 39 are provided which are designated 39', 39'' and 39''' respectively. When hereinafter three similar parts occur, these will also be designated with one, two or three apostrophes respectively. When the cover is closed the supports 39 co-operate with the stabilizing plate and determine the position thereof relative to the cover 3. The supports then bear directly against the stabilizing plate itself.

The resilient attachments of the stabilizing plate 38 to the cover comprise a number of guide pins 40 which are rigidly connected to the cover, see in particular FIG. 4. These are mounted with play in corresponding openings in the guide plate. Near their free ends which face away from the cover the guide pins comprise stops 41 against which the stabilizing plate 38 bears when the cover 4 is open. Between the cover 4 and the stabilizing plate pressure springs 42 are disposed around the guide pins.

The supports 39 on the covering plate 3 are provided with recesses 43 in which the stops 41 are lodged when the cover is closed. In the embodiment shown in FIG. 1 the supports are not adjustable relative to the covering plate 3. However, as shown in FIG. 4, the supports may be provided with a threaded projection which co-operates with a threaded hole in the covering plate.

The stabilizing plate comprises a central air admission aperture 44. During playing of a record air can be admitted through said aperture between the stabilizing plate 38 and the rotating record 6. The cover 4 is provided with a hole 45 which corresponds to the central air admission aperture 44. The edge 46 of the air admission aperture of the stabilizing plate is rigidly connected to the cover 4, for example by cementing. The resilient connection of the stabilizing plate to the cover is disposed near its periphery and the stabilizing plate itself is made of a resilient material, for example a thin sheet of methyl metacrylate. When the cover is closed the distance between a rotating record 6 and the edge 46 of the air admission aperture is of the order of 1 mm greater than the distance between the circumference of the record and the stabilizing plate.

The operation of the playing apparatus 1 is best illustrated with reference to FIGS. 1 and 4. When a flexible video record is to be played, the cover 4 is opened and the adapter disc 31 is first fitted on the drive spindle 12. As previously stated, and as can be derived from FIG. 1, this is a very simple operation, because as has also been discussed, the adapter disc need not be exactly parallel to the covering plate 3 of the housing 2, but may be arranged on the centering member 16 in an arbitrary oblique position. Subsequently, in an entirely similar operation the flexible record 6 is arranged on the adapter disc and the drive spindle 12. The cover 4 is closed so that the record loading device 15 assumes the position of FIG. 4 and the pressure ring presses the video record 6 against the adapter disc 31 in the manner shown. The machine is revved up, the drive torque being transmitted to the assembly of adapter disc 31 and video record 6 by the friction blocks 19 and, to a substantially smaller extent, also by the centering member 16. The air molecules between the video record and the adapter disc will be subject to a centrifugal force and will move in outward directions. As a result of this an air gap 34 is produced between the video record and the adapter disc, to which air is supplied via the openings 33 which air is discharged again at the periphery of the video record. The bottom of the recess 32 has been selected to be at such a distance from the upper surface 35 of the adapter disc 31, that an air gap with a thickness of approx. 0.5 mm is obtained, so that dust particles cannot become trapped between the two discs.

The diameter of the central hole 30 of the adapter disc 30 is selected so that when rigid video records having a thickness of for example amply 1 mm or flexible video records having a thickness of for example 0.2 mm are used, both types of records having a central hole of equal diameter, the optical pathlength for the light beam 9 is substantially the same in either case. For this purpose the distance between the plane-parallel surfaces of the adapter disc 31 may be selected to be of the order of magnitude of 1 mm at the given thicknesses of the two types of video records. The distance from the bottom of the central recess 32 to the plane-parallel surface 35 is also selected to be approximately 1 mm.

Stabilization of the flexible video record 6 at the upper side is effected by means of an air cushion which is produced between the record and the stabilizing plate 38. The hole 45 in the cover 4 communicates with the ambient air via a number of slots 47. Through said slots air is admitted between the rim edge 46 of the stabilizing plate and the video record 6. In a similar way as the air flow which has just been described is obtained between the adapter disc 31 and the video record, an air flow will also be produced at the top surface of the video record directed from the center of the video record towards its circumference. Owing to the decreasing height of the air gap between the video record and the stabilizing plate 38 an extra stabilizing effect will occur, while moreover it is prevented that the video record is drawn against the stabilizing plate 38. The air which flows between the video record and the adapter disc and between the video record and the stabilizing plate, can find a way out via a second opening 48 in the cover 4.

Although the present embodiment relates to a video player on which a video record is disposed with the aid of a transparent adapter disc, the stabilizing plate may also be used to advantage in conjunction with rigid video records.

What is claimed is:

1. A playing apparatus in particular a video player, for playing round records which are provided with information tracks and comprising:
    a housing with a substantially flat covering plate,
    a motor driven spindle which extends from the housing for rotating a record parallel to the covering plate,
    a cover hinged to the housing and in the closed condition covering the covering plate and drive spindle, and
    a stabilizing plate resiliently connected to the cover and extends substantially perpendicularly to the axis of the drive spindle when the cover is closed, for stabilizing a record during playing in its plane of rotation, while the cover is closed, a number of supports on the covering plate abutting said stabilizing plate when the cover is closed and being spaced therefrom when the cover is open, whereby the position of the stabilizing plate relative to the covering plate is determined by said supports.

2. A playing apparatus as claimed in claim 1, wherein:
    the resilient attachment of the stabilizing plate to the cover comprises a number of guide pins which are rigidly connected to the cover,
    the stabilizing plate is provided with openings which surround the guide pins with play,
    the guide pins near their free ends which face away from the cover comprise stops for the guide plate, and
    between the cover and the stabilizing plate pressure springs are arranged around the guide pins.

3. A playing apparatus as claimed in claim 1, wherein the supports on the covering plate are provided with recesses for receiving the free ends of the guide pins when the cover is closed.

4. A playing apparatus as claimed in claim 1, wherein the supports are adjustable in height relative to the covering plate.

5. A playing apparatus as claimed in claim 1, wherein the stabilizing plate has a central air admission aperture through which during playing of a record air is admitted between the stabilizing plate and the rotating record, wherein
    the cover is provided with a hole which corresponds to the air admission aperture of the stabilizing plate,
    the edge of the air admission aperture of the stabilizing plate is rigidly connected to the cover,
    the resilient connection of the stabilizing plate to the cover is located near its circumference, and
    the stabilizing plate is made of a resiliently deformable material.

6. A playing apparatus as claimed in claim 5, wherein when the cover is closed the distance between a rotating record and the edge of the air admission aperture is of the order of 1 mm greater than the distance between the circumference of the record and the stabilizing plate.

* * * * *